United States Patent [19]

von Au et al.

[11] Patent Number: 4,652,662

[45] Date of Patent: Mar. 24, 1987

[54] PROCESS FOR PREPARING ORGANOFUNCTIONAL ORGANOPOLYSILOXANES

[75] Inventors: Günther von Au, Sao Paulo, Brazil; Karl Braunsperger, Burghausen, Fed. Rep. of Germany; Karl Huhn, Burghausen, Fed. Rep. of Germany; Ingomar Kovar, Burghausen, Fed. Rep. of Germany

[73] Assignee: Wacker-Chemie GmbH, Munich, Fed. Rep. of Germany

[21] Appl. No.: 733,562

[22] Filed: May 14, 1985

[30] Foreign Application Priority Data

May 17, 1984 [DE] Fed. Rep. of Germany ....... 3418358

[51] Int. Cl.[4] ............................ C07F 7/08; C07F 7/10; C07D 303/02

[52] U.S. Cl. .................................... 549/215; 556/413; 556/423; 556/424; 556/425; 556/439; 556/445

[58] Field of Search ............... 556/413, 423, 424, 439, 556/425, 445; 549/215

[56] References Cited

U.S. PATENT DOCUMENTS 4,152,346  5/1979  Seiler et al. ..................... 556/425 X Primary Examiner—Paul F. Shaver

[57] ABSTRACT

A process for preparing organofunctional organopolysiloxanes which comprises reacting a cyclic diorganopolysiloxane with a silane having a SiC-bonded monovalent organic radical with at least one functional group and at least one SiOC-bonded monovalent hydrocarbon radical which can be substituted by an ether oxygen atom, or with an oligomer of such a silane having a maximum of 10 silicon atoms per molecule, in the presence of a quaternary ammonium hydroxide.

3 Claims, No Drawings

PROCESS FOR PREPARING ORGANOFUNCTIONAL ORGANOPOLYSILOXANES

A process for preparing organopolysiloxanes and more particularly an equilibration process for preparing organofunctional organopolysiloxanes.

BACKGROUND OF THE INVENTION

A process for preparing organofunctional organopolysiloxanes is described in European Patent Application EP-OS No. 0068671 (published Jan. 5, 1983), in which an octamethylcyclotetrasiloxane, for example, is reacted with, for example, N-(2-aminoethyl)-3-aminopropylmethyldimethoxysilane in the presence of tetramethylammonium silanolate.

In order to prepare the organofunctional organopolysiloxanes in accordance with the process described above, where a cyclic diorganopolysiloxane, such as octamethylcyclotetrasiloxane is reacted with a silane which has a SiC-bonded monovalent organic radical having at least one functional group and at least one SiOC-bonded monovalent hydrocarbon radical that can be substituted by an ether oxygen atom, such as N-(2-aminoethyl)-3-aminopropylmethyldimethoxysilane, or with an oligomer of such a silane having a maximum of 10 silicon atoms per molecule, it is essential that the silanolate be first prepared by reacting a quaternary ammonium hydroxide with a silicon compound. In addition, the viscosity of the organofunctional organopolysiloxanes obtained from the process have a tendency to change over a period of time when stored. Furthermore, in the process described in the European patent application for preparing the organofunctional organopolysiloxanes, the ratio of silane to diorganopolysiloxane is very limited.

Therefore, it is an object of the present invention to provide a process for preparing organofunctional organopolysiloxanes. Another object of the present invention is to provide a process for preparing organopolysiloxanes in the absence of quaternary ammonium silanolates. Still another object of the present invention is to provide a process for preparing organofunctional organopolysiloxanes in which the viscosity does not substantially change when stored over a period of time. A further object of the present invention is to provide a process for preparing organofunctional organopolysiloxanes in which the ratio of silane to diorganopolysiloxane is not critical.

SUMMARY OF THE INVENTION

The foregoing objects and others which will become apparent from the following description are accomplished in accordance with this invention, generally speaking, by providing a process for preparing organofunctional organopolysiloxanes which comprises reacting a cyclic diorganopolysiloxane with a silane which has a SiC-bonded monovalent organic radical having at least one functional group and at least one SiOC-bonded monovalent hydrocarbon radical which can be substituted by an ether oxygen atom, or with an oligomer of such a silane having a maximum of 10 silicon atoms per molecule, in the presence of a quaternary ammonium hydroxide.

DESCRIPTION OF THE INVENTION

The cyclic diorganopolysiloxanes used in the process of this invention are preferably those having the formula $(R_2SiO)_n$, where R represents the same or different monovalent hydrocarbon radicals having from 1 to 18 carbon atoms per radical and n is an integer of from 3 to 10.

Examples of radicals represented by R are alkyl radicals, such as the methyl, ethyl, n-propyl, isopropyl, n-butyl and sec-butyl radical and octadecyl radicals; cycloalkyl radicals, such as the cyclohexyl radical; aliphatic hydrocarbon radicals having carbon-carbon multiple bonds, especially double bonds, such as the vinyl and allyl radicals; aryl radicals, such as the phenyl radical; aralkyl radicals, such as the benzyl radical, and alkaryl radicals, such as the tolyl radicals.

It is preferred that all hydrocarbon radicals represented by R in the formula representing the cyclic diorganopolysiloxanes used in the process of this invention be alkyl radicals, and more preferably methyl radicals, such as in hexamethylcyclotrisiloxane and octamethylcyclotetrasiloxane.

It is possible to use only one type of cyclic diorganopolysiloxane; however, mixtures of at least two types of cyclic diorganopolysiloxanes which differ with respect to the type of hydrocarbon radicals or the number of siloxane units per molecule, or with respect to both the type of hydrocarbon radicals and the number of siloxane units per molecule may be used.

The use of mixtures of at least two types of cyclic diorganopolysiloxanes that are identical with respect to the type of hydrocarbon radicals yet differ with respect to the number of siloxane units per molecule is preferred, due to the availability of such mixtures.

The silanes used in the process of this invention are the same silanes as those which have been or could have been equilibrated with a cyclic diorganopolysiloxane in the presence of a basic catalyst. Silanes which may be employed in the equilibration are those having a SiC-bonded monovalent organic radical with at least one functional group and at least one SiOC-bonded monovalent hydrocarbon radical per molecule which can be substituted by an ether oxygen atom and oligomers of such silanes having a maximum of 10 silicon atoms per molecule.

The preferred silanes have the formula $R_a ZSi(OR^1)_{3-a}$, in which R is the same as above, $R^1$ is an alkyl radical that has from 1 to 6 carbon atoms per molecule, which can be substituted by an ether oxygen atom, Z is a radical of the formula $R^2NH(CH_2CH_2NH)_b R^3-$, (i)

where $R^2$ is hydrogen or an alkyl radical having from 1 to 4 carbon atoms, $R^3$ is a bivalent hydrocarbon radical having from 1 to 6 carbon atoms, b is 0 or 1; or (ii) a halogenated hydrocarbon radical which can be substituted by an ether oxygen atom, or (iii) a vinyl radical or (iv) a radical of the formula $CH_2=CR^4OOCR^3-$, where $R^3$ is the same as above, $R^4$ is hydrogen or a methyl group, or (v) a radical of the formula

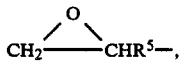

where $R^5$ is a bivalent hydrocarbon radical having from 1 to 6 carbon atoms, which can be substituted by an ether oxygen atom, and a is 0, 1 or 2, but preferably 1. Preferably Z is a radical of the formula

in which $R^2$ and $R^3$ are the same as above.

The preferred examples of $R^1$ radicals are the methyl, ethyl, n-propyl and isopropyl radical and the methoxyethylene radical.

The examples given above for alkyl radicals represented by R having from 1 to 4 carbon atoms also apply to the alkyl radicals represented by $R^2$.

The preferred examples of bivalent hydrocarbon radicals represented by R are radicals having the formulas $-(CH_2)_m-$, $-(CHR^4)_m-$ and phenylene radicals, in which $R^4$ is the same as above and m is 1, 2, 3 or 4.

The examples given for bivalent hydrocarbon radicals represented by $R^3$ also apply to the bivalent hydrocarbon radicals represented by $R^5$.

An example of a radical of the formula

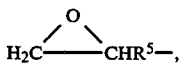

in which $R^5$ is a bivalent hydrocarbon radical which is substituted by an ether oxygen atom, is a radical of the formula

Preferred examples of halogenated hydrocarbon radicals represented by Z which can be substituted by an ether oxygen atom are the 3-chloropropyl radical and the radical of the formula $CF_3CHFCH_2O(CH_2)_3-$.

An example of an oligomer which can be used in the process of this invention is a siloxane of the formula

It is possible to use only one type of silane which has a SiC-bonded monovalent hydrocarbon radical having at least one functional group and at least one SiOC-bonded monovalent hydrocarbon radical which can be substituted by an ether oxygen atom in the process of this invention, or it is possible to use a mixture of at least two different types of such silanes. The same is true of the oligomers of such silanes.

It is preferred that a silane which has a SiC-bonded monovalent organic radical having at least one functional group and at least one SiOC-bonded monovalent hydrocarbon radical which can be substituted by an ether oxygen atom, or an oligomer of such a silane having a maximum of 10 silicon atoms per molecule, be used in an amount of from 0.001 to 0.05 mole of monovalent organic radical having at least one functional group in the silane or the oligomer of such a silane per mole of siloxane unit in the cyclic diorganopolysiloxane.

Examples of quaternary ammonium hydroxides which can be used in the process of this invention are tetramethylammonium hydroxide, benzyltriethylammonium hydroxide, tetra-n-propylammonium hydroxide, tetra-n-benzylammonium hydroxide, benzyltrimethylammonium hydroxide and benzyldimethylethylammonium hydroxide. Benzyltrimethylammonium hydroxide is the preferred quaternary ammonium hydroxide.

The quaternary ammonium hydroxide is preferably used in an amount of from 0.00005 to 0.0008 percent by weight, based on the total weight of the organosilicon compounds used in the process of this invention.

Moreover, the quaternary ammonium hydroxide is preferably used in the form of a solution. Examples of solvents which may be used in the preparation of such solutions are polar solvents, such as water and alkanols, for example, methanol, ethanol, n-propanol, isopropanol and butanols, and mixtures of at least two of such solvents.

The solvents are preferably used in an amount of from 40 to 80 percent by weight, based on the weight of the particular quaternary ammonium hydroxide used.

The process of this invention is an equilibration process. The reaction of a cyclic diorganopolysiloxane with a silane of the type given above and/or the oligomer thereof is carried out preferably at from 50° C. to 100° C. and at atmospheric pressure; that is at 1020 hPa (absolute) or approximately 1020 hPa (absolute). Higher or lower pressures can, however, also be used, if desired.

The quaternary ammonium hydroxide can, of course, be brought into contact with the organosilicon compounds used in the process of this invention by merely mixing a quaternary ammonium hydroxide with the two classes of organosilicon compounds. The quaternary ammonium hydroxide is in contact with the two classes of organosilicon compounds during the equilibration reaction.

When the equilibration reaction is complete, the quaternary ammonium hydroxide can be rendered inactive by heating it above its decomposition temperature; generally, a temperature of 150° C. is sufficient.

When Z is a radical of the formula

and a is 2, the organofunctional organopolysiloxanes formed in the process of this invention may be used to treat textile materials to improve their feel.

If Z is the same as above and a has a value of 0 or 1, the organofunctional organopolysiloxanes formed in accordance with this invention cross-link on fibres when exposed to air without using further cross-linking agents, such as organopolysiloxanes having Si-bonded hydrogen, and crosslinking catalysts, such as tin compounds.

In the following examples all parts and percentages are by weight, unless otherwise specified.

EXAMPLE 1

A mixture containing 1 part of silane having the formula

H₂N(CH₂)₂NH(CH₂)₃SiCH₃(OCH₃)₂ and 80 parts of a mixture of cyclic dimethylpolysiloxanes having from 3 to 10 siloxane units per molecule and 0.03 parts of a 40 percent solution of benzyltrimethylammonium hydroxide in methanol is heated under nitrogen, while stirring, at 80° C. for 4 hours. The quaternary ammonium hydroxide is then rendered inactive by heating for 60 minutes at 150° C. and at 13 hPa (absolute) while at the same time removing constituents which boil under these conditions. The organofunctional organopolysiloxane thus obtained has a viscosity of 5800 mm².s⁻¹ at 25° C., which rises to only 6100 mm².s⁻¹ over a period of 12 months at room temperature.

EXAMPLE 2

The procedure described in example 1 is repeated, except that 443 parts of a mixture of cyclic dimethylpolysiloxanes are substituted for the 80 parts of such a mixture, and 0.0035 parts of the 40 percent solution of benzyltrimethylammonium hydroxide are substituted for 0.03 parts of this solution.

The resulting organofunctional organopolysiloxane has a viscosity of 42 400 mm².s⁻¹ at 25° C.

EXAMPLE 3

The procedure described in example 1 is repeated, except that 8.3 parts of a mixture of cyclic dimethylpolysiloxanes are substituted for the 80 parts of such a mixture, and 0.00006 parts of the 40 percent solution of benzyltrimethylammonium hydroxide are substituted for the 0.03 parts of this solution.

The organofunctional organopolysiloxane thus obtained has a viscosity of 62 mm².s⁻¹ at 25° C.

What is claimed is:

1. A process for preparing organofunctional organopolysiloxanes which comprises reacting (1) a cyclic diorganopolysiloxane with (2) an organosilicon compound selected from the group consisting of (A) a silane having the formula $R_aZSi(OR^1)_{3-a}$ where R is a monovalent hydrocarbon radical having from 1 to 18 carbon atoms; $R^1$ is selected from the group consisting of alkyl radicals having from 1 to 6 carbon atoms per molecule and alkyl radicals substituted by an ether oxygen atoms; a is 0, 1 or 2; Z is a radical selected from the group consisting of
  (i) $R^2NH(CH_2CH_2NH)_bR^3$—;
  (ii) a halogenated hydrocarbon radical which can be substituted by an ether oxygen atom;
  (iii) a vinyl radical;
  (iv) a radical of the formula $CH_2=CR^4OOCR^3$; and
  (v) a radical of the formula $$CH_2\overset{O}{\underset{\phantom{X}}{\diagup\diagdown}}CHR^5,$$

where $R^2$ is selected from the group consisting of hydrogen and an alkyl radical having from 1 to 4 carbon atoms; $R^3$ is a bivalent hydrocarbon radical having from 1 to 6 carbon atoms; $R^4$ is selected from the group consisting of hydrogen and a methyl radical; $R^5$ is selected from the group consisting of a bivalent hydrocarbon radical having from 1 to 6 carbon atoms and a bivalent hydrocarbon radical substituted by an ether oxygen atom and b is 0 or 1; and (B) a siloxane of such a silane having a maximum of 10 silicon atoms per molecule, in the presence of (3) a quaternary ammonium hydroxide.

2. The process of claim 1, wherein the quaternary ammonium hydroxide is benzyl trimethylammonium hydroxide.

3. The process of claim 1, wherein the organosilicon compound is a siloxane of such a silane having a maximum of 10 silicon atoms per molecule.

* * * * *